Patented Mar. 30, 1943

2,314,919

UNITED STATES PATENT OFFICE 2,314,919

METHOD FOR REMOVING WEAKLY ACIDIC SUBSTANCES FROM WATER-IMMISCIBLE LIQUIDS

Donald C. Bond, Northbrook, George W. Ayers, Jr., Chicago, and Lawrence M. Henderson, Winnetka, Ill., assignors to The Pure Oil Company, Chicago, Ill., a corporation of Ohio No Drawing. Application March 13, 1941, Serial No. 383,160

8 Claims. (Cl. 196—32)

This invention relates to a method for removing weakly acidic substances from otherwise neutral water-immiscible liquids and to a reagent useful in connection therewith. More particularly, the invention involves a method and reagent for removing mercaptans from hydrocarbon liquids.

It is known that the ability of alkaline solutions to remove weakly acidic substances such as mercaptans from hydrocarbon liquids such as gasoline can be materially enhanced by adding to the alkaline solution low boiling fatty acids, naphthenic acids and alkyl phenols or the alkali metal salts thereof.

We have discovered that the efficiency of alkali solutions in removing weakly acidic substances such as mercaptans from water-immiscible liquids such as hydrocarbon oil, can be increased by adding to the alkali solution shellac, natural or synthetic. By synthetic shellac is meant those alkali soluble resins produced by lactide condensation as described on pages 1004–1007 of "The Chemistry of Synthetic Resins" by Carlton Ellis, published in 1935 by Reinhold Publishing Corporation. For the purpose of this invention any of the various grades of shellac such as clean dry bleached, super-fine, fine orange and TN may be used.

In preparing reagents in accordance with our invention an aqueous alkali metal hydroxide solution, preferably sodium or potassium hydroxide, is prepared and shellac or shellac-like resin either dissolved directly in the alkali metal hydroxide solution or the shellac or shellac-like resin first reacted with alkali and the reaction product dissolved in the aqueous alkali solution. Although the alkali metal hydroxide and shellac content of the treating solution may vary within wide limits, in order to effectively remove the mercaptans or other weakly acidic material from liquids in which they are present, the treating solution should contain at least 5% by weight of free alkali metal hydroxide and not less than 10% by weight of shellac. The upper limit of free alkali metal hydroxide content is approximately 30% since higher concentrations make the treating solution too viscous. The upper limit of shellac content is determined by the solubility of the shellac in the solution, but the quantity of shellac is preferably maintained below 40% in order to keep the treating solution from being too viscous. The amount of shellac which will dissolve in the solution varies with the alkali concentration of the solution.

In treating a hydrocarbon oil or other weak acid-containing, water-immiscible liquid with the treating reagent, the two are contacted with each other either in a batch operation or in a conventional continuous countercurrent operation at atmospheric temperatures and preferably in the absence of air in order to eliminate the possibility of oxidation of mercaptans to oil-soluble disulfides. Where batch operation is used, the ratio of treating solution to liquid being treated may vary within wide limits. We have found that approximately 5% to 10% by volume of treating solution based on the oil gives satisfactory results. The treatment may be repeated with new batches of treating solution as often as is necessary to remove the required amount of acidic material. When treating in continuous countercurrent method, the time of contact between treating reagent and liquid being treated and the ratio of treating reagent to oil treated may be regulated by the length of the treating column or the number of treating columns connected in series.

Where hydrocarbon distillates are treated to remove mercaptans, the treating reagent extracts mercaptans from distillates containing the same in the form of alkali metal mercaptides. The used treating agent can be readily regenerated by heating to a temperature of 220° F. or higher, which is sufficient to decompose the mercaptides and volatilize the mercaptans either with or without the aid of open superheated steam which assists in decomposing the mercaptides. The regenerated solution may be re-used preferably after adjusting, if necessary, the alkali metal and/or water content of the solution so that they are approximately the same as the fresh treating solution.

The following examples demonstrate the efficiency of the alkali metal hydroxide shellac solution in removing mercaptans from cracked gasoline:

*Example 1.*—Cracked gasoline prepared by cracking petroleum oil under high pressures and temperatures and which gasoline contained .0265% of mercaptans was treated with 7% by volume of an aqueous sodium hydroxide solution containing 15% by weight of sodium hydroxide. The gasoline and treating solution were shaken for a period of five minutes in an atmosphere of nitrogen and then separated from each other. The treated gasoline was found to contain .013% of mercaptans. 51% of the mercaptans were removed from the gasoline.

*Example 2.*—Another sample of the same gasoline as was treated in Example 1 was treated in the same manner and with the same amount as in Example 1 of an aqueous solution prepared by dissolving sodium hydroxide and shellac in water in amounts such that the sodium hydroxide constituted 15% by weight and the shellac constituted 10% by weight of the solution. The shellac had an acid number of 60. Gasoline treated with this reagent was found to contain .0109% mercaptans, thereby showing that the reagent had removed 59% of the mercaptans from the gasoline.

*Example 3.*—A third sample of the same gasoline was treated in the same manner as in the preceding examples with a reagent prepared by dissolving 15% by weight of sodium hydroxide and 20% by weight of shellac in water. The percentages of sodium hydroxide and shellac were based on the final solution. This shellac was the same as used in Example 2. The treated gasoline had a mercaptan content of .0095, thus showing that 64% of the mercaptans had been removed from the gasoline.

In Examples 2 and 3 the shellac was added to the sodium hydroxide solution in pulverized condition with the result that a portion of the sodium hydroxide was necessary to react with the shellac, thereby reducing the amount of free sodium hydroxide in the solution. If the shellac is first reacted with sodium hydroxide and the reaction product added to the caustic soda solution or the caustic soda solution adjusted either before or after addition of shellac so that the quantity of free sodium hydroxide present is the same as that in Example 1, the improvement in mercaptan extraction over the caustic soda solution in which no shellac is present is even greater than that shown in the examples.

We claim:

1. The method of removing weakly acidic substances from otherwise neutral water-immiscible organic liquid which comprises contacting said liquid with an aqueous solution containing alkali metal hydroxide and the reaction product of alkali and a material selected from the group consisting of natural and synthetic shellac.

2. The method of removing mercaptans from hydrocarbon distillate which comprises contacting said distillate with an aqueous solution containing alkali metal hydroxide and the reaction product of alkali and a material selected from the group consisting of natural and synthetic shellac.

3. Method in accordance with claim 1 in which the solution contains at least 5% by weight of free alkali metal hydroxide and at least 10% by weight of material selected from the group consisting of natural and synthetic shellac.

4. Method in accordance with claim 2 in which the solution contains at least 5% by weight of free alkali metal hydroxide and at least 10% by weight of material selected from the group consisting of natural and synthetic shellac.

5. Method in accordance with claim 1 in which the solution contains approximately 5-30% by weight of free alkali metal hydroxide and an amount of shellac not substantially less than 10% by weight nor more than that amount which is soluble in the solution.

6. Method in accordance with claim 2 in which the solution contains approximately 5-30% by weight of free alkali metal hydroxide and an amount of shellac not substantially less than 10% by weight nor more than that amount which is soluble in the solution.

7. The method of removing mercaptans from hydrocarbon oil which comprises contacting said oil with an aqueous alkali metal hydroxide solution containing the reaction product of natural shellac and alkali.

8. Method in accordance with claim 7 in which the solution contains between 5% and 30% by weight of free alkali metal hydroxide and an amount of natural shellac not substantially less than 10% nor more than that amount which is soluble in the solution.

DONALD C. BOND.
GEORGE W. AYERS, Jr.
LAWRENCE M. HENDERSON.